(12) United States Patent
Takami et al.

(10) Patent No.: US 12,567,447 B2
(45) Date of Patent: Mar. 3, 2026

(54) HARD DISK DRIVE SPOILER WITH TOP DISK FLOW MITIGATION

(71) Applicant: Western Digital Technologies, Inc., San Jose, CA (US)

(72) Inventors: Gakuto Takami, Yokohama (JP); Yoshiyuki Hirono, Chigasaki (JP); Takaaki Deguchi, Kamakura (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/755,444

(22) Filed: Jun. 26, 2024

(65) Prior Publication Data

US 2026/0004817 A1     Jan. 1, 2026

(51) Int. Cl.
*G11B 33/14* (2006.01)

(52) U.S. Cl.
CPC ................................ *G11B 33/1446* (2013.01)

(58) Field of Classification Search
None
See application file for complete search history.

(56) References Cited

U.S. PATENT DOCUMENTS

| | | | | |
|---|---|---|---|---|
| 7,554,762 B2 * | 6/2009 | Suwa | ................... | G11B 25/043 |
| | | | | 360/97.14 |
| 7,830,636 B2 | 11/2010 | Ang et al. | | |
| 8,179,632 B2 | 5/2012 | Yao et al. | | |
| 10,734,018 B1 * | 8/2020 | Uehara | ................ | G11B 25/043 |
| 2005/0185324 A1 * | 8/2005 | Suwa | ................... | G11B 5/6005 |

| | | | | |
|---|---|---|---|---|
| 2007/0002490 A1 * | 1/2007 | Suwa | ................... | G11B 33/148 |
| 2007/0025015 A1 * | 2/2007 | Suwa | ................... | G11B 33/146 |
| 2008/0043369 A1 * | 2/2008 | Takemori | ........... | G11B 33/1473 |
| | | | | 360/110 |
| 2009/0034125 A1 | 2/2009 | Chan et al. | | |
| 2009/0279203 A1 * | 11/2009 | Chan | ................... | G11B 33/148 |
| | | | | 360/97.11 |
| 2010/0134920 A1 | 6/2010 | Mizumoto et al. | | |

(Continued)

FOREIGN PATENT DOCUMENTS

| | | |
|---|---|---|
| CN | 117316202 A | 12/2023 |
| JP | 2016197483 A | 11/2016 |
| JP | 2022148046 A | 10/2022 |

OTHER PUBLICATIONS

Introduction of the collaborative activity of KT Method & TRIZ to improve Hard Disk Drive's Quality and ReliabilityTsuwaka, Kazushi, 16 pages, copyright 2010 Hitachi Global Storage Technologies, downloaded at http://triz-japan.org/PRESENTATION/sympo2011/ Pres-Japan/J09eS-Tsuwako%28Hitachi_GST%29-110820.pdf.

(Continued)

*Primary Examiner* — William J Klimowicz
(74) *Attorney, Agent, or Firm* — John D. Henkhaus

(57)     ABSTRACT

An upstream spoiler for a hard disk drive (HDD) includes a top fin configured to cover a radial gap between the top fin and a top disk medium of an HDD to inhibit gas/air flow to a top surface of the top disk through the gap. The spoiler may further include a middle fin adjacent the top fin and a mounting structure configured for mounting the spoiler in an HDD, where the top fin extends circumferentially in an upstream direction beyond the middle fin and tapers down toward the mounting structure, thereby inhibiting particulates from entering a space between an HDD cover and the top disk.

18 Claims, 9 Drawing Sheets

(56)                    References Cited

U.S. PATENT DOCUMENTS

| | | | |
|---|---|---|---|
| 2011/0090592 A1* | 4/2011 | Hendriks | G11B 33/148 |
| | | | 360/97.16 |
| 2011/0169299 A1* | 7/2011 | Goenueldinc | B62D 35/007 |
| | | | 296/180.5 |
| 2013/0088795 A1* | 4/2013 | Brown | G11B 33/146 |
| 2013/0188280 A1 | 7/2013 | Sawanaka | |
| 2020/0258540 A1* | 8/2020 | Uehara | G11B 5/4833 |
| 2022/0262397 A1* | 8/2022 | Kimura | G11B 5/66 |
| 2022/0310115 A1* | 9/2022 | Tukada | G11B 5/012 |
| 2023/0420003 A1* | 12/2023 | Kuribara | G11B 25/043 |
| 2025/0087247 A1* | 3/2025 | Zaima | G11B 33/146 |

OTHER PUBLICATIONS

Hirono, Yoshiyuki et al. , Flow-induced vibration reduction in HDD by using a spoiler, IEEE Transactions on Magnetics, Jul. 2004, Manuscript, pp. 3168-3170, vol. 40, No. 4.

* cited by examiner

HARD DISK DRIVE SPOILER WITH TOP DISK FLOW MITIGATION

FIELD OF EMBODIMENTS

Embodiments of the invention may relate generally to hard disk drives, and particularly to approaches to an upstream spoiler configured with an upward flow mitigator.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") housed in a slider that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic-recording disk, which in turn magnetizes a small area on the recording medium.

Because the recording disks spin within an HDD during operation, gas (e.g., air, helium, etc.) flow is generated. Indeed, the air bearing slider (or, generally, gas bearing slider) on which a read-write head is housed relies on such gas flow in order to fly over a disk in order to function as purposed. However, such gas flow generated within an HDD can have detrimental operational effects when impinging upon or interacting with the disk stack, as well as in the distribution of contaminant particulates within the HDD. Hence, managing the gas flow within an HDD is considered an ongoing design challenge.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Figure 1:
FIG. 1 is a plan view illustrating a hard disk drive, according to an embodiment.

Generally, approaches to a hard disk drive (HDD) upstream spoiler configured to mitigate flow to the top surface of the top disk are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment or to every embodiment.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the structure is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

There are a number of detrimental effects that may occur within an HDD over time, simply due to operation and the nature of the device components. One detrimental effect involves disk surface scratches associated with particulates, contaminants, debris on the surface of the media and/or head slider, whereby such particulates and the like may be generated from within the HDD during use thereof. Particulates (e.g., dust) can be especially troublesome inside an HDD, such as by causing scratches to a recording disk, slider flying height problems, and the like. Ultimately, particulates undesirably introduced into an HDD can cause an HDD failure.

An HDD may include an upstream spoiler, which may include an opening for an airborne particle filter. When the upstream spoiler diverts the flow of gas from the magnetic-recording head, the spoiler creates an area of relatively greater pressure in the flow of gas preceding the spoiler. Gas in the area of greater pressure flows through the airborne particle filter to an area of relatively lesser pressure, thereby removing airborne particles from the flow within the enclosure of the HDD. Notwithstanding the presence of an airborne particle filter, the gas flow generated and circulated by the spinning disks within an HDD can have detrimental operational effects in numerous contexts, where one such effect of this internal gas flow involves the distribution of particulates throughout the HDD. For example, particulates within an HDD tend to adhere to the top surface of the top disk. The reason for this is due to the rising airflow generated in the gap between the disk and the base, which flows into the gap between the disk and the cover. In particular, this typically occurs upstream of the spoiler fin where the gas flow caused by the rotating disk is intercepted. To prevent the foregoing, a top fin adjacent the top disk may be designed into an upstream spoiler, especially for where there is a significant amount of upward flow.

Upstream Spoiler

Figures 2A, 2B:
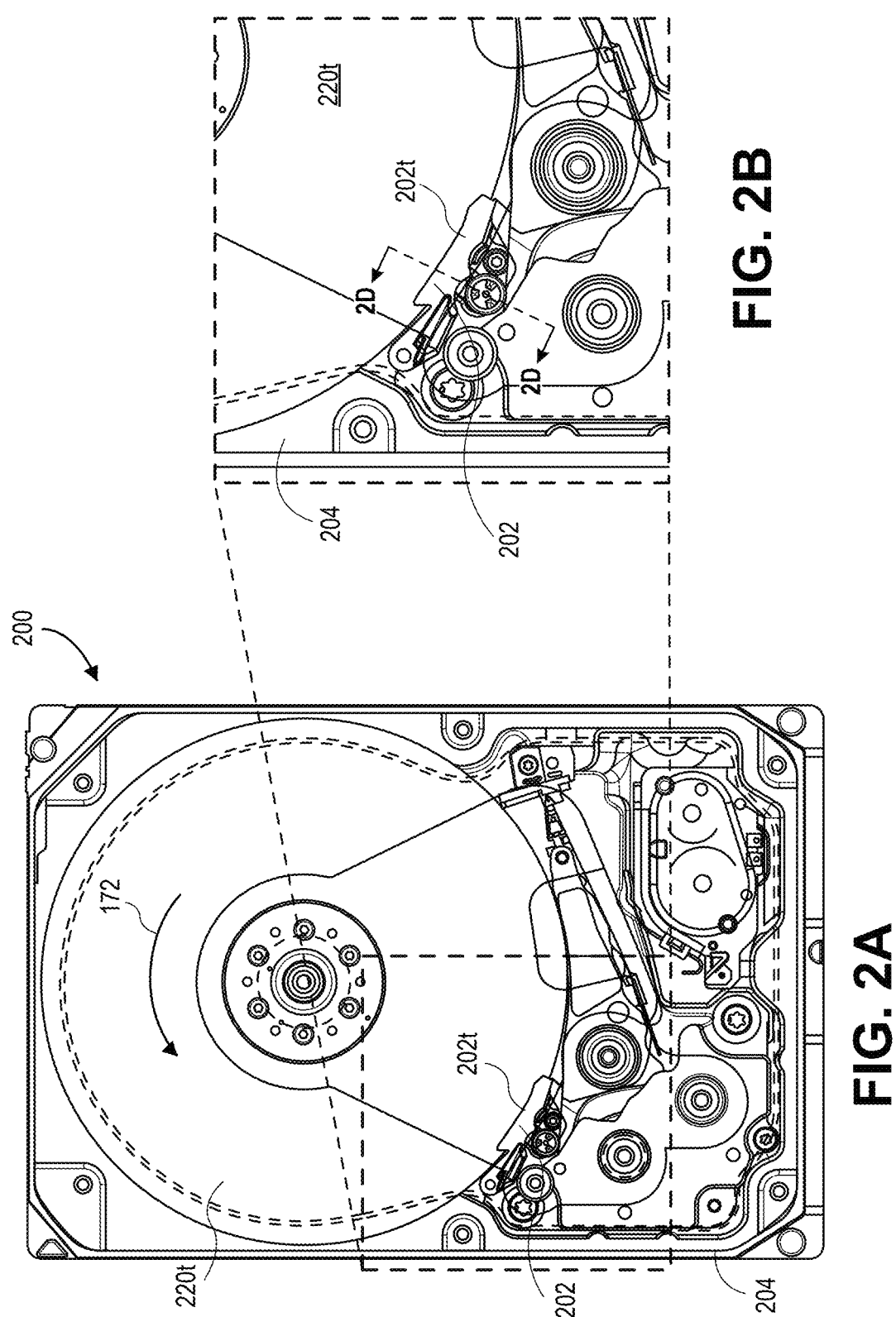
FIG. 2A is a plan view illustrating a hard disk drive (HDD) comprising an upstream spoiler.
FIG. 2B is a magnified plan view illustrating the spoiler of FIG. 2A.

FIG. 2A is a plan view illustrating a hard disk drive (HDD) comprising an upstream spoiler, and FIG. 2B is a magnified plan view illustrating the spoiler of FIG. 2A. Here, HDD 200 comprises an upstream spoiler 202. Spoiler 202 includes a top fin 202$t$ which is the uppermost fin that in part overlaps with an outer diameter portion of the top disk 220$t$ of a disk stack. This top fin 202$t$ functions to inhibit the aforementioned rising airflow generated in the gap between the disk stack and the HDD base 204, which would otherwise tend to flow into the space between the top disk 220$t$ and HDD cover (removed and not shown here, for a view of components installed in the drive), and which largely occurs upstream of the spoiler fins where the flow caused by the rotating disk stack (see, e.g., direction 172 of FIG. 1) is intercepted by the spoiler 202 fins.

Figure 2C:
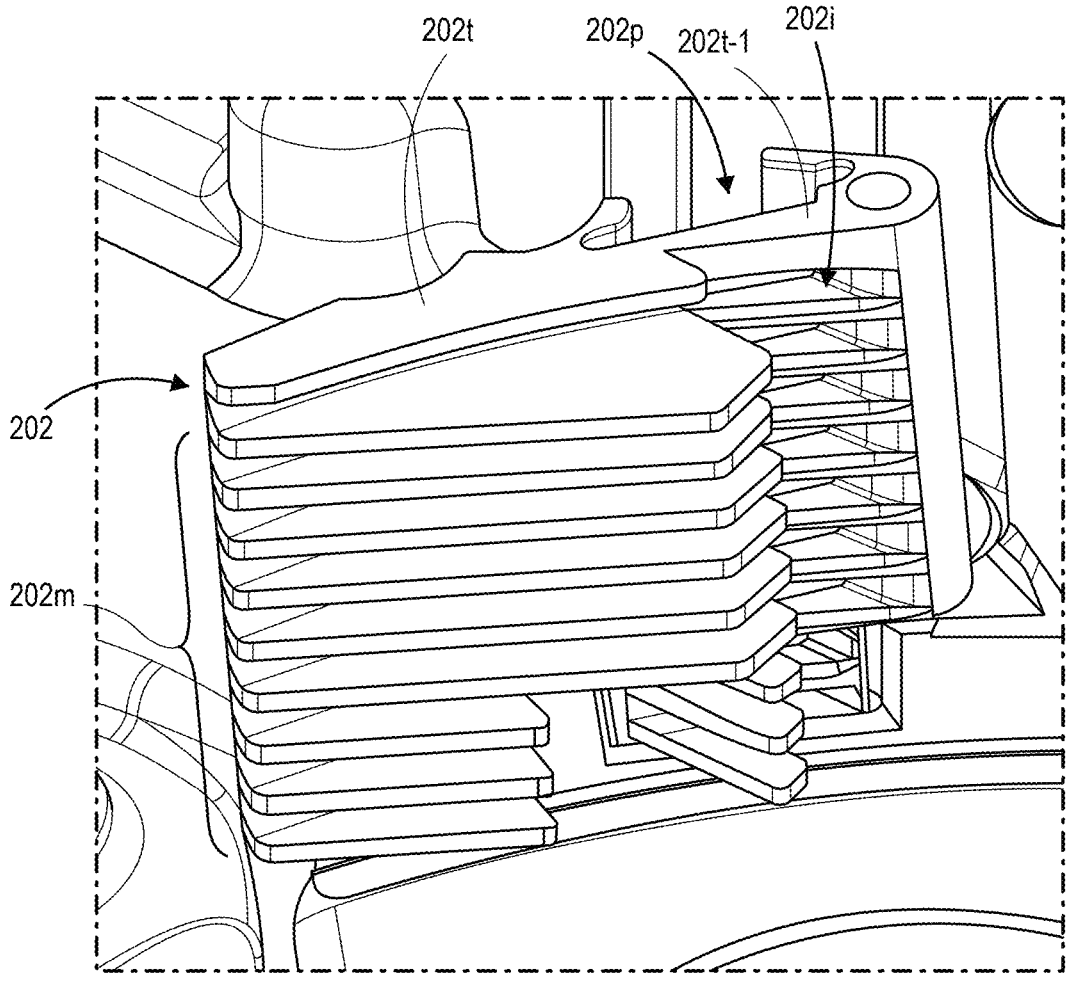
FIG. 2C is a perspective view illustrating the spoiler of FIG. 2A.
Figure 2D:
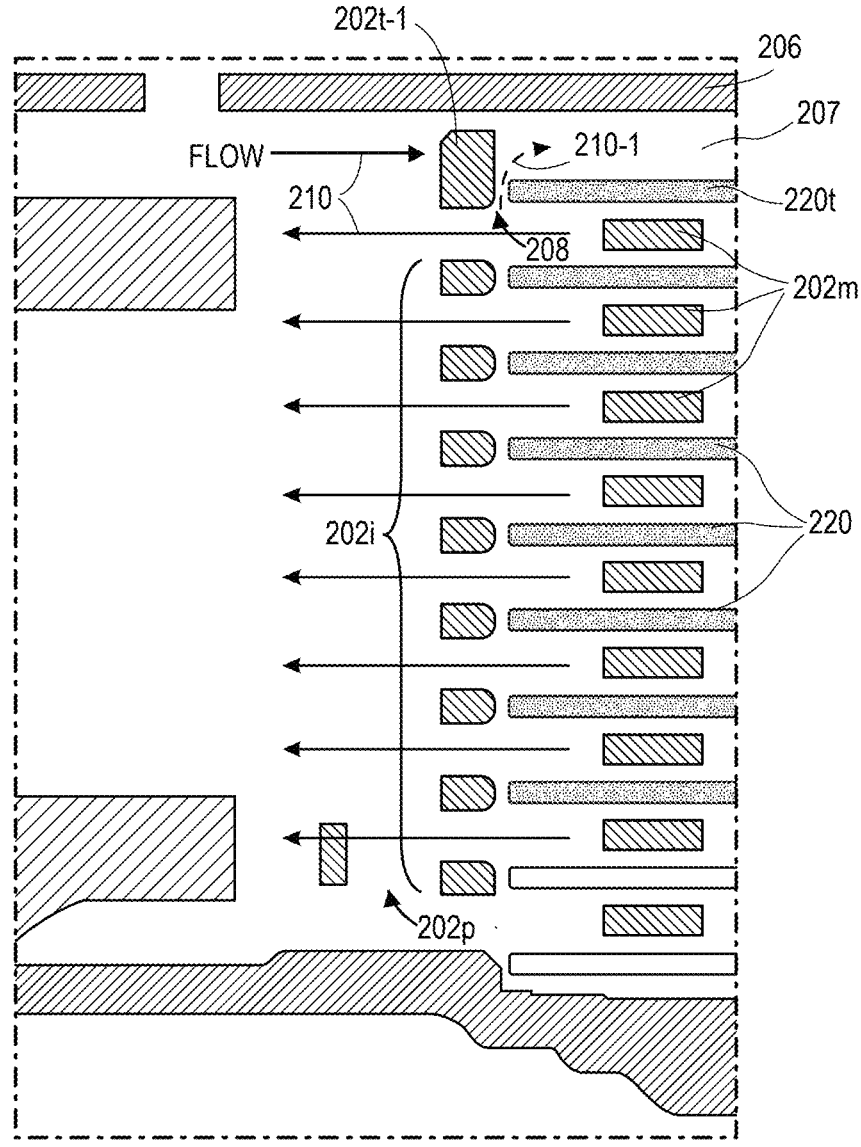
FIG. 2D is a cross-sectional side view illustrating the spoiler of FIG. 2A.

FIG. 2C is a perspective view illustrating the spoiler of FIG. 2A. This view shows the shape of the top fin 202$t$ of spoiler 202, as well as the shapes of multiple middle fins 202$m$ of the spoiler 202, which are interposed between adjacent disks of a disk stack (removed here for clarity). FIG. 2C further illustrates the presence of a filter pocket 202$p$ of spoiler 202, which is configured to house an aforementioned airborne particle filter (not shown), and a closeout portion 202$t$-1 of the top fin 202$t$ that is configured to close out the filter pocket 202$p$ between the top disk 220$t$ (FIGS. 2A-2B, 2D) and an HDD cover 206 (FIG. 2D). Closeout portion 202$t$-1 functions to prevent backflow toward the disk area, thus preventing some flow from entering the top disk 220$t$ area at the upstream high pressure area of interception by the spoiler 202 fins. However, there may remain an issue with flow into the top gap 207 (FIG. 2D), i.e., between cover 206 and top disk 220$t$ (FIG. 2D), from between the base 204 (FIGS. 2A-2B) wall and the top disk 220$t$.

FIG. 2D is a cross-sectional side view illustrating the spoiler of FIG. 2A. Shown here are the multiple middle fins 202$m$ (only some of which are labeled here for clarity) interposed between adjacent disks 220 (only some of which are labeled here for clarity), spoiler 202 fin inter-structures 202$i$, and the closeout portion 202$t$-1 of top fin 202$t$ (FIG. 2C). The resultant gas/air flow is represented by the group of arrows 210 (only some of which are labeled here for clarity). Of particular concern in the context of flow and corresponding particulates entering the top gap 207 is the flow 210-1, which can enter the top gap 207 from a small radial gap 208 between the top fin 202$t$ and the corresponding top disk 220$t$.

Upstream Spoiler with Top Disk Flow Mitigator

Figures 3A, 3B:
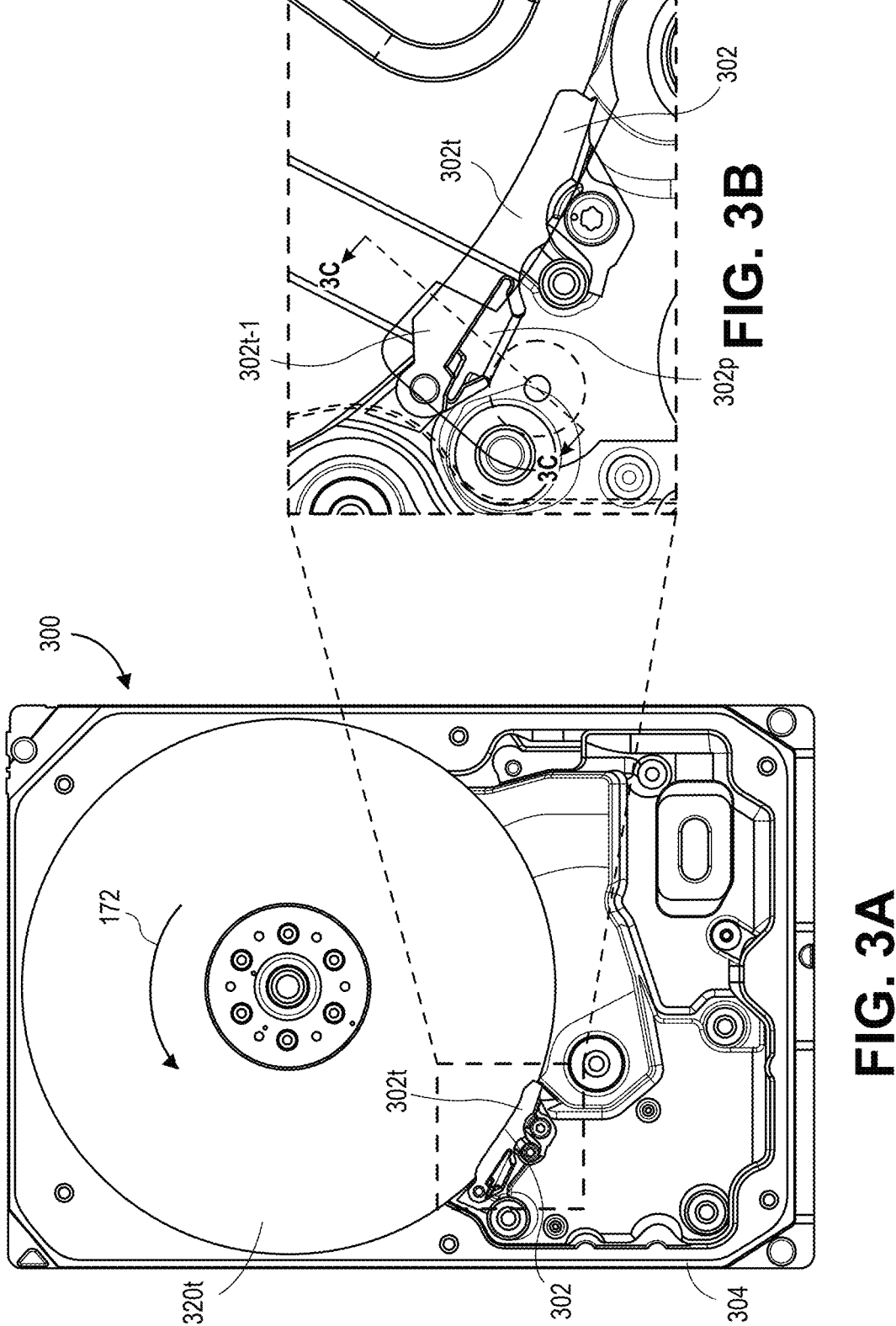
FIG. 3A is a plan view illustrating an HDD comprising an upstream spoiler, according to one or more embodiment.
FIG. 3B is a magnified plan view illustrating the spoiler of FIG. 3A, according to one or more embodiment.
Figure 3C:
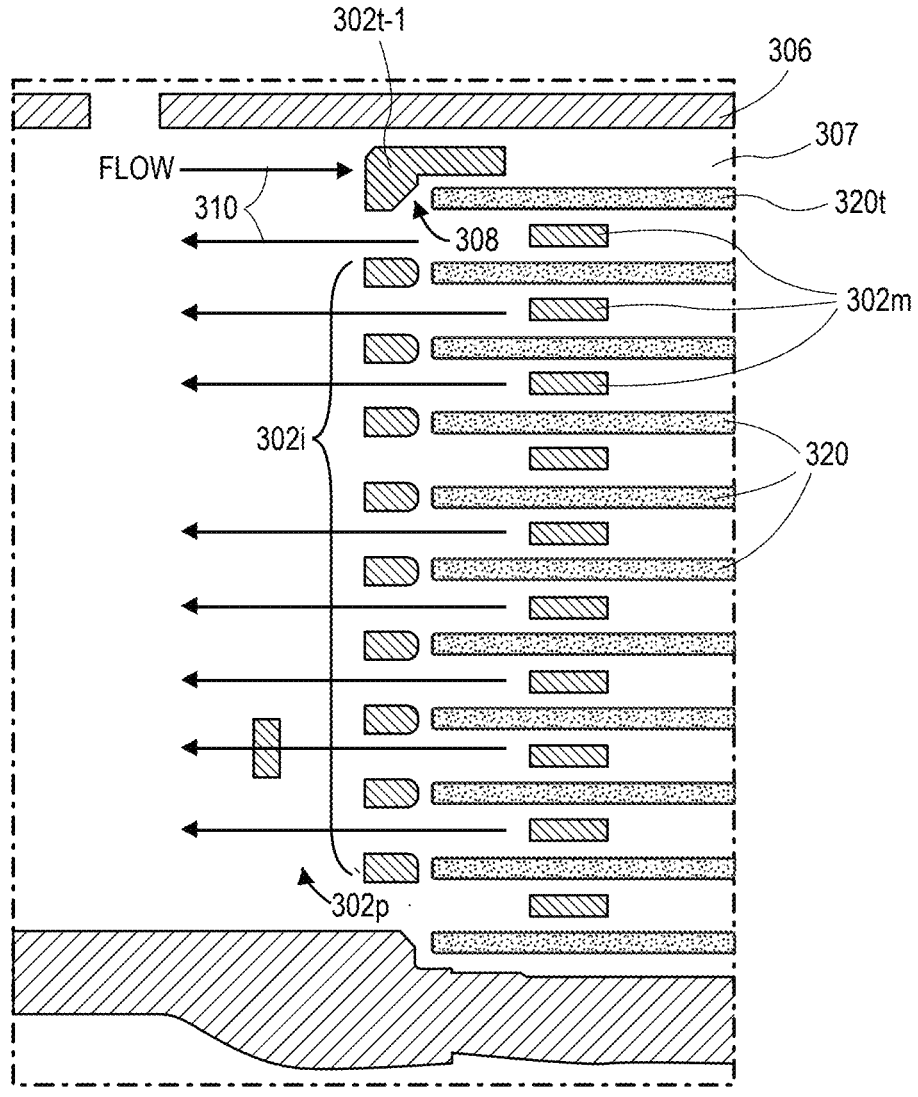
FIG. 3C is a cross-sectional side view illustrating the spoiler of FIG. 3A, according to one or more embodiment.

FIG. 3A is a plan view illustrating an HDD comprising an upstream spoiler, and FIG. 3B is a magnified plan view illustrating the spoiler of FIG. 3A, both according to one or more embodiment. Upstream spoiler 302 includes a top fin 302$t$ which is the uppermost fin that in part overlaps with an outer diameter portion of the top disk 320$t$ of a disk stack. FIG. 3B further illustrates the presence of a filter pocket 302$p$ of spoiler 302, which is configured to house an aforementioned airborne particle filter (not shown), and a closeout portion 302$t$-1 of the top fin 302$t$ that is configured to close out the filter pocket 302$p$ between the top disk 320$t$ and an HDD cover 306 (FIG. 3C). The top fin 302$t$ functions to inhibit the aforementioned rising airflow generated in the gap between the disk stack and the HDD base 304, in addition to inhibiting the flow from entering the top gap 307 (FIG. 3C), i.e., between cover 306 and top disk 320$t$ (see also FIG. 3C), from between the base 304 (FIG. 3C) wall and the top disk 320$t$. Note that the precise shape and size of top fin 302$t$ may vary from implementation to implementation and, therefore, the shape and size of the top fin 302$t$ depicted herein is set forth at least in part as a practical example. According to embodiment(s), spoiler 302 is configured to inhibit gas flow to the top surface of the top disk 320$t$ through a gap between the spoiler 302 and the top disk 320$t$.

FIG. 3C is a cross-sectional side view illustrating the spoiler of FIG. 3A, according to one or more embodiment. Shown here are multiple middle fins 302$m$ (only some of which are labeled here for clarity) interposed between adjacent disks 320 (only some of which are labeled here for clarity), spoiler 302 fin inter-structures 302$i$, and a closeout portion 302$t$-1 of top fin 302$t$. The resultant gas/air flow is represented by the group of arrows 310 (only some of which are labeled here for clarity). Of particular concern in the context of flow and corresponding particulates inhibited from entering the top gap 307 is the absence of flow 210-1 (FIG. 2D). According to an embodiment(s), the gap comprises a top radial gap 308 positioned radially between the top disk 320$t$ and at least a portion of the top fin 302$t$ of the spoiler 302, and the closeout portion 302$t$-1 of the top fin 302$t$ is configured to cover that top radial gap 308.

Figure 4A:
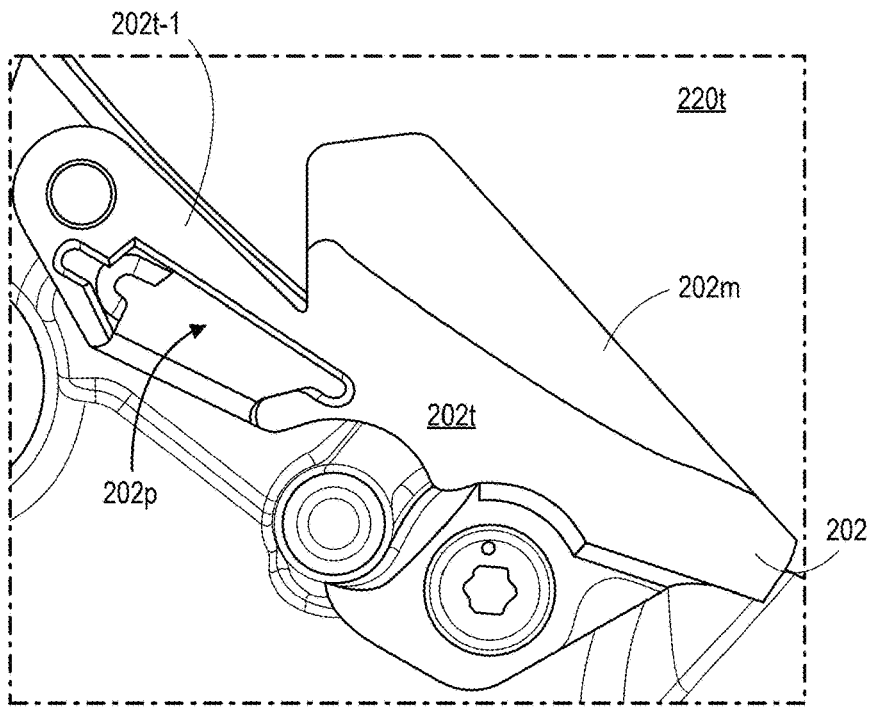
FIG. 4A is a magnified plan view illustrating the spoiler of FIG. 2A.
Figure 4B:
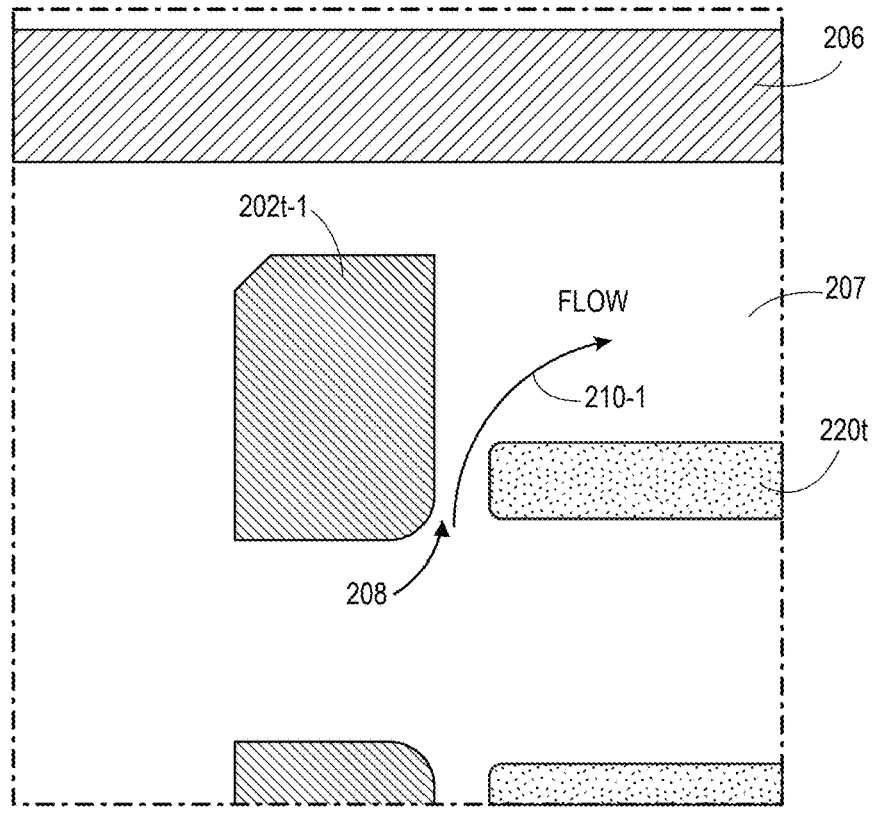
FIG. 4B is a cross-sectional side view illustrating a top fin of the spoiler of FIG. 4A adjacent a corresponding top disk medium.
Figure 5A:
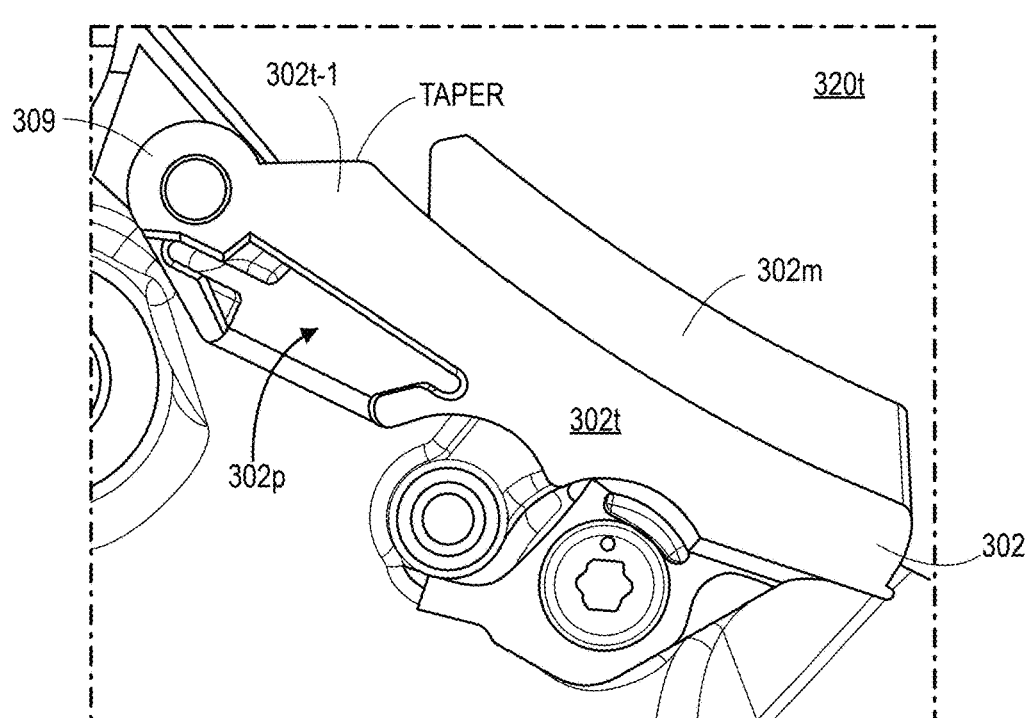
FIG. 5A is a magnified plan view illustrating the spoiler of FIG. 3A, according to one or more embodiment.
Figure 5B:
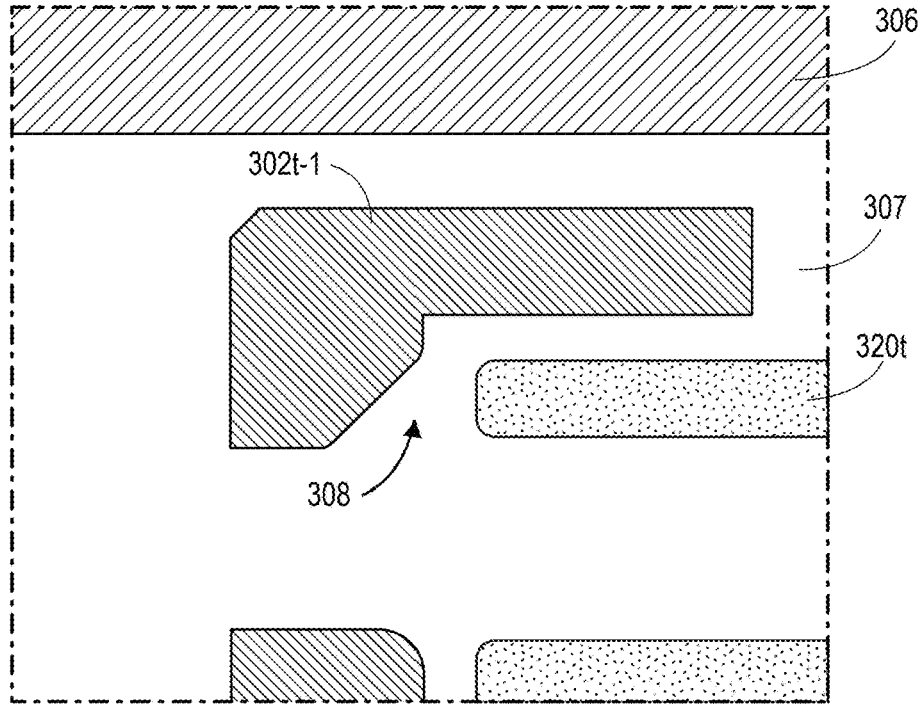
FIG. 5B is a cross-sectional side view illustrating a top fin of the spoiler of FIG. 5A adjacent a corresponding top disk medium, according to one or more embodiment.

FIG. 4A is a magnified plan view illustrating the spoiler of FIG. 2A, and FIG. 4B is a cross-sectional side view illustrating a top fin of the spoiler of FIG. 4A adjacent a corresponding top disk medium. FIG. 5A is a magnified plan view illustrating the spoiler of FIG. 3A, and FIG. 5B is a cross-sectional side view illustrating a top fin of the spoiler of FIG. 5A adjacent a corresponding top disk medium, according to one or more embodiment. Contrasting spoiler 202 of FIGS. 4A-4B and spoiler 302 of FIGS. 5A-5B, according to one or more embodiments the closeout portion 302$t$-1 of the top fin 302$t$ of spoiler 302 is configured to cover the top radial gap 308 positioned radially between the top disk 320*t* and the top fin 302*t* of the spoiler 302 (see, e.g., FIG. 5B), thereby inhibiting particulates from entering the top gap 307 between the cover 306 and the top disk 320*t*.

As depicted in FIG. 5A and according to one or more embodiments, the top fin 302*t* extends circumferentially upstream beyond an adjacent middle fin 302*m* of the spoiler 302 before tapering down toward a spoiler mount structure 309 for mounting the spoiler 302 in an HDD, in contrast with the top fin 202*t* of spoiler 202. This portion of top fin 302*t* that extends beyond the adjacent middle fin 302*m* functions to overlap with an outer diameter portion of top disk 320*t* and to thus cover the top radial gap 308. As described elsewhere herein, the precise shape and size of top fin 302*t* may vary from implementation to implementation and, therefore, the shape and size of the top fin 302*t* depicted herein is set forth at least in part as a practical example.

As further depicted in FIG. 5A and according to one or more embodiments, the top fin 302*t* extends circumferentially upstream in a substantially constant radius beyond a majority of the filter pocket 302*p* (and a corresponding filter when installed), again in contrast with the top fin 202*t* of spoiler 202. This arrangement of top fin 302*t* that extends beyond a majority of the filter pocket 302*p* at least in part functions to inhibit backflow toward the disk area from outside of that area, e.g., from behind the filter area, and upward flow beyond the filter area and through the top radial gap 308.

Method of Manufacturing an Upstream Spoiler for a Hard Disk Drive

Figure 6:
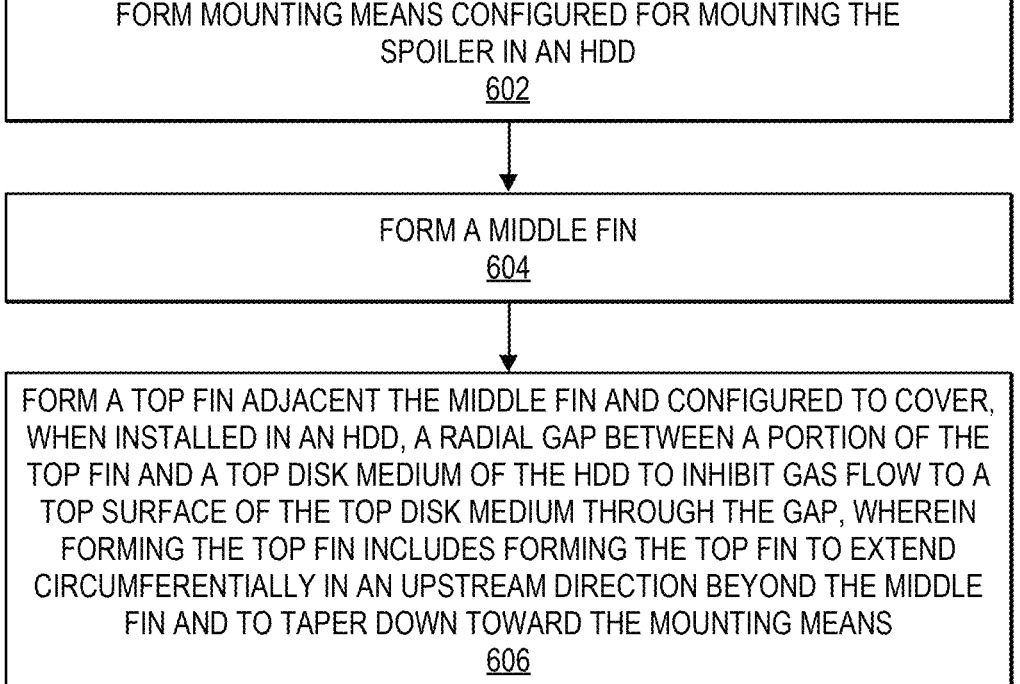
FIG. 6 is a flowchart illustrating a method of manufacturing an upstream spoiler for an HDD, according to one or more embodiment.

FIG. 6 is a flowchart illustrating a method of manufacturing an upstream spoiler for an HDD, according to one or more embodiment. For example, the method of FIG. 6 may be implemented to a spoiler such as upstream spoiler 302 as exemplified in the illustrations and descriptions corresponding to FIGS. 3A-3C, 5A-5B. Note that while process steps are set forth here in a particular order as a matter of necessity, the order in which the blocks of FIG. 6 are presented are not limiting to the manufacturing process. For example, if a spoiler manufactured as described is fabricated utilizing molding technology (e.g., injection molding), then the blocks of FIG. 6 may be performed substantially simultaneously.

At block 602, form mounting means configured for mounting the spoiler in a hard disk drive (HDD). For example, mounting structure 309 (FIG. 5A) of spoiler 302 (FIGS. 3A-3B, 5A) is formed, utilizing known means of fabrication such as but not limited to molding process(es).

At block 604, form a middle fin. For example, middle fin 302*m* (FIG. 5A) of spoiler 302 is formed, utilizing known means of fabrication.

At block 606, form a top fin adjacent to the middle fin and configured to cover, when installed in an HDD, a radial gap between a portion of the top fin and a top disk medium of the HDD to inhibit gas flow to a top surface of the top disk medium through the gap. For example, top fin 302*t* (FIGS. 3A-3B, 5A) of spoiler 302 is formed adjacent to middle fin 302*m*, utilizing known means of fabrication. Recall that the order in which blocks 602-606 are presented are not limiting to the manufacturing process because if, for example, such a spoiler is fabricated utilizing molding technology then such actions may in practice be performed effectively simultaneously. According to an embodiment, forming the top fin 302*t* includes forming the top fin 302*t* to extend circumferentially in an upstream direction beyond the middle fin 302*m* and to taper down toward the mounting means 309, to cover a top radial gap 308 radially between a top disk 320*t* (FIGS. 3A, 3C, 5A) and at least a portion of the top fin 302*t* in an area of interest (e.g., area of high pressure), to thereby inhibit particulates from entering a top gap 307 (FIGS. 3C, 5B) between an HDD cover 306 (FIGS. 3C, 5B) and the top disk 320*t*.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110*a*, are transmitted by a flexible cable assembly (FCA) 156 (or "flex cable", or "flexible printed circuit" (FPC)). Interconnection between the flex cable 156 and the head 110*a* may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feedthrough provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110*b* rides so that the slider 110*b* flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110*b* rides.

The electrical signal provided to the voice coil 140 of the VCM enables the head 110*a* of the HGA 110 to access a track 176 on which information is recorded. Thus, the armature 136 of the VCM swings through an arc 180, which enables the head 110*a* of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110*a* of the HGA 110 reads the servo-burst-signal pattern, which provides a position-error-signal (PES) to the servo electronics, which controls the electrical signal provided to the voice coil 140 of the VCM, thereby enabling the head 110*a* to follow the track 176. Upon finding the track 176 and identifying a particular sectored track portion 188, the head 110*a* either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive (HDD) comprising:
a plurality of disk media including a top disk medium rotatably mounted on a spindle;
a head slider housing a read-write transducer configured to read from and to write to the top disk medium;
an actuator configured for moving the head slider to access portions of the top disk medium;
an enclosure comprising a base and a cover, the enclosure housing the plurality of disk media, the head slider, and the actuator; and
a spoiler positioned upstream of the head slider and configured to inhibit gas flow to a top surface of the top disk medium through a gap between the spoiler and the top disk medium, the spoiler comprising:
a pocket housing a filter;
wherein:
the gap comprises a top gap positioned radially between the top disk medium and a top fin of the spoiler; and
a curved innermost edge of the top fin with a substantially constant radius extends circumferentially upstream along a majority of the filter.

2. The HDD of claim 1, wherein the top fin is configured to cover the top gap.

3. The HDD of claim 2, wherein the top fin is further configured to overlap with an outer diameter portion of the top disk medium.

4. The HDD of claim 1, wherein
the curved innermost edge of the top fin extends circumferentially upstream beyond an adjacent middle fin of the spoiler and tapers down toward a spoiler mount structure.

5. The HDD of claim 4, wherein the portion of the top fin extending beyond the adjacent middle fin is further configured to overlap with an outer diameter portion of the top disk medium.

6. The HDD of claim 1, wherein the spoiler is fabricated utilizing molding technology.

7. An upstream spoiler for a hard disk drive (HDD), the spoiler comprising:
a top fin configured to cover a radial gap between a portion of the top fin and a top disk medium of an HDD to inhibit gas flow to a top surface of the top disk medium through the gap; and
a pocket configured for housing a filter and positioned in a radial direction away from a curved innermost edge of the top fin;
wherein the curved innermost edge of the top fin, having a substantially constant radius throughout, extends circumferentially along a majority of the pocket.

8. The spoiler of claim 7, wherein the top fin is further configured to overlap with an outer diameter portion of the top disk medium.

9. The spoiler of claim 7, further comprising:
a middle fin adjacent to the top fin; and
a mounting structure configured for mounting the spoiler in an HDD;
wherein the curved innermost edge of the top fin extends circumferentially in an upstream direction beyond the middle fin and tapers down toward the mounting structure.

10. The spoiler of claim 9, wherein the portion of the top fin extending beyond the adjacent middle fin is further configured to overlap with an outer diameter portion of the top disk medium.

11. A hard disk drive comprising the spoiler of claim 7.

12. The spoiler of claim 7, wherein the spoiler is fabricated utilizing molding technology.

13. A method of manufacturing an upstream spoiler for a hard disk drive (HDD), the method comprising:
forming a top fin configured to cover, when installed in an HDD, a radial gap between a portion of the top fin and a top disk medium of the HDD to inhibit gas flow to a top surface of the top disk medium through the gap; and
forming a pocket configured for housing a filter in a radial direction away from a curved innermost edge of the top fin;
wherein forming the top fin includes forming the curved innermost edge of the top fin with a substantially constant radius throughout to extend circumferentially along a majority of the pocket.

14. The method of claim 13, wherein forming the top fin includes forming the top fin to overlap, when installed in the HDD, with an outer diameter portion of the top disk medium.

15. The method of claim 13, further comprising:
forming a middle fin adjacent to the top fin; and
forming mounting means configured for mounting the spoiler in an HDD;
wherein forming the top fin includes forming the curved innermost edge of the top fin to extend circumferentially in an upstream direction beyond the middle fin and to taper down toward the mounting means.

16. The method of claim 15, wherein forming the top fin includes forming the portion of the top fin to overlap, when installed in the HDD, with an outer diameter portion of the top disk medium.

17. An upstream spoiler manufactured according to the method of claim 13.

18. The method of claim 13, wherein the steps of forming utilize molding technology.

* * * * *